(12) United States Patent
Shekhar

(10) Patent No.: US 8,615,015 B1
(45) Date of Patent: Dec. 24, 2013

(54) APPARATUS, SYSTEMS AND METHODS FOR AGGREGATE ROUTES WITHIN A COMMUNICATIONS NETWORK

(75) Inventor: Ravi Shekhar, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 188 days.

(21) Appl. No.: 12/981,678

(22) Filed: Dec. 30, 2010

(51) Int. Cl.
*H04L 12/28* (2006.01)

(52) U.S. Cl.
USPC ...... 370/400; 370/256; 370/389; 370/395.31; 370/401; 370/408

(58) Field of Classification Search
USPC ............ 370/256, 389, 392, 395.31, 400, 401, 370/408
See application file for complete search history.

(56) References Cited

U.S. PATENT DOCUMENTS

| | | | | |
|---|---|---|---|---|
| 6,546,391 | B1 * | 4/2003 | Tsuruoka | 1/1 |
| 6,553,002 | B1 * | 4/2003 | Bremer et al. | 370/254 |
| 6,675,163 | B1 * | 1/2004 | Bass et al. | 1/1 |
| 6,934,252 | B2 * | 8/2005 | Mehrotra et al. | 370/229 |
| 7,031,320 | B2 * | 4/2006 | Choe | 370/395.31 |
| 7,079,537 | B1 * | 7/2006 | Kanuri et al. | 370/392 |
| 7,180,887 | B1 * | 2/2007 | Schwaderer et al. | 370/351 |
| 7,315,547 | B2 * | 1/2008 | Yazaki et al. | 370/401 |
| 7,426,518 | B2 * | 9/2008 | Venkatachary et al. | 1/1 |
| 7,885,268 | B2 * | 2/2011 | Pong | 370/395.32 |
| 7,899,067 | B2 * | 3/2011 | Rangarajan et al. | 370/408 |
| 7,903,658 | B1 * | 3/2011 | Kireeti et al. | 370/392 |
| 7,966,421 | B2 * | 6/2011 | Brown | 709/245 |
| 7,984,038 | B2 * | 7/2011 | Bass et al. | 707/712 |
| 8,023,519 | B2 * | 9/2011 | Brown et al. | 370/408 |
| 2002/0048272 | A1 * | 4/2002 | Carvey | 370/400 |
| 2002/0051427 | A1 * | 5/2002 | Carvey | 370/254 |
| 2002/0080798 | A1 * | 6/2002 | Hariguchi et al. | 370/395.31 |
| 2002/0118682 | A1 * | 8/2002 | Choe | 370/395.31 |
| 2004/0062208 | A1 * | 4/2004 | Brown et al. | 370/256 |
| 2006/0173831 | A1 * | 8/2006 | Basso et al. | 707/3 |
| 2007/0115968 | A1 * | 5/2007 | Brown | 370/389 |
| 2008/0275872 | A1 * | 11/2008 | Venkatachary et al. | 707/5 |

\* cited by examiner

*Primary Examiner* — Andrew Lai
*Assistant Examiner* — Andrew C Lee
(74) *Attorney, Agent, or Firm* — Cooley LLP

(57) ABSTRACT

An apparatus includes a memory configured to store multiple route descriptors as a tree, a communications interface configured to be in communication with an access switch, and a processor operatively coupled to the memory and the communications interface. Each route descriptor is a node within the tree, and includes a next hop destination associated with a next hop destination of a route associated with that route descriptor and a next hop indicator associated with a quantity of routes represented by that route descriptor. A first route descriptor has a first child route descriptor and a second child route descriptor. The processor is configured to define, at a first time, a value of the next hop destination of the first route descriptor and to send, at a second time after the first time, the value of the next hop destination of the first route descriptor to the access switch.

20 Claims, 6 Drawing Sheets

APPARATUS, SYSTEMS AND METHODS FOR AGGREGATE ROUTES WITHIN A COMMUNICATIONS NETWORK

BACKGROUND

One or more embodiments relate generally to aggregation of routes within communications networks. More specifically, one or more embodiments relate to aggregation of host routes and prevention of routing loops within a distributed network switch.

Known methods of route aggregation allow manual aggregation of multiple routes into less specific routes. Furthermore, known methods of route aggregation do not coordinate route aggregation across multiple network elements to prevent routing loops. Thus, such known methods of route aggregation fail to provide automatic aggregation of multiple routes and routing loop prevention.

SUMMARY

In one embodiment, an apparatus includes a memory configured to store a set of route descriptors as a tree, a communications interface configured to be in communication with an access switch, and a processor operatively coupled to the memory and the communications interface. Each route descriptor from the set of route descriptors includes a next hop destination having a value associated with the best next hop destination of a route associated with that route descriptor. Each route descriptor includes a group of next hop indicator(s) having a value associated with a quantity of routes not required to be installed if the next hop destination associated with that next hop indicator is used by the route represented by that route descriptor. The routes indication can be a prefix route with a prefix mask to cover destination routes with a common prefix value. As such, each prefix route can cover a set of route-destinations. Each route descriptor from the set of route descriptors is a node from a set of nodes of the tree. The processor is configured to access a first route descriptor from the set of route descriptors. The first route descriptor has a first child route descriptor from the set of route descriptors and a second child route descriptor from the set of route descriptors. The set of route-destinations that the first child route descriptor and the second child route descriptor represent can be a subset of routes that the first route descriptor represents.

DETAILED DESCRIPTION

Figure 1:
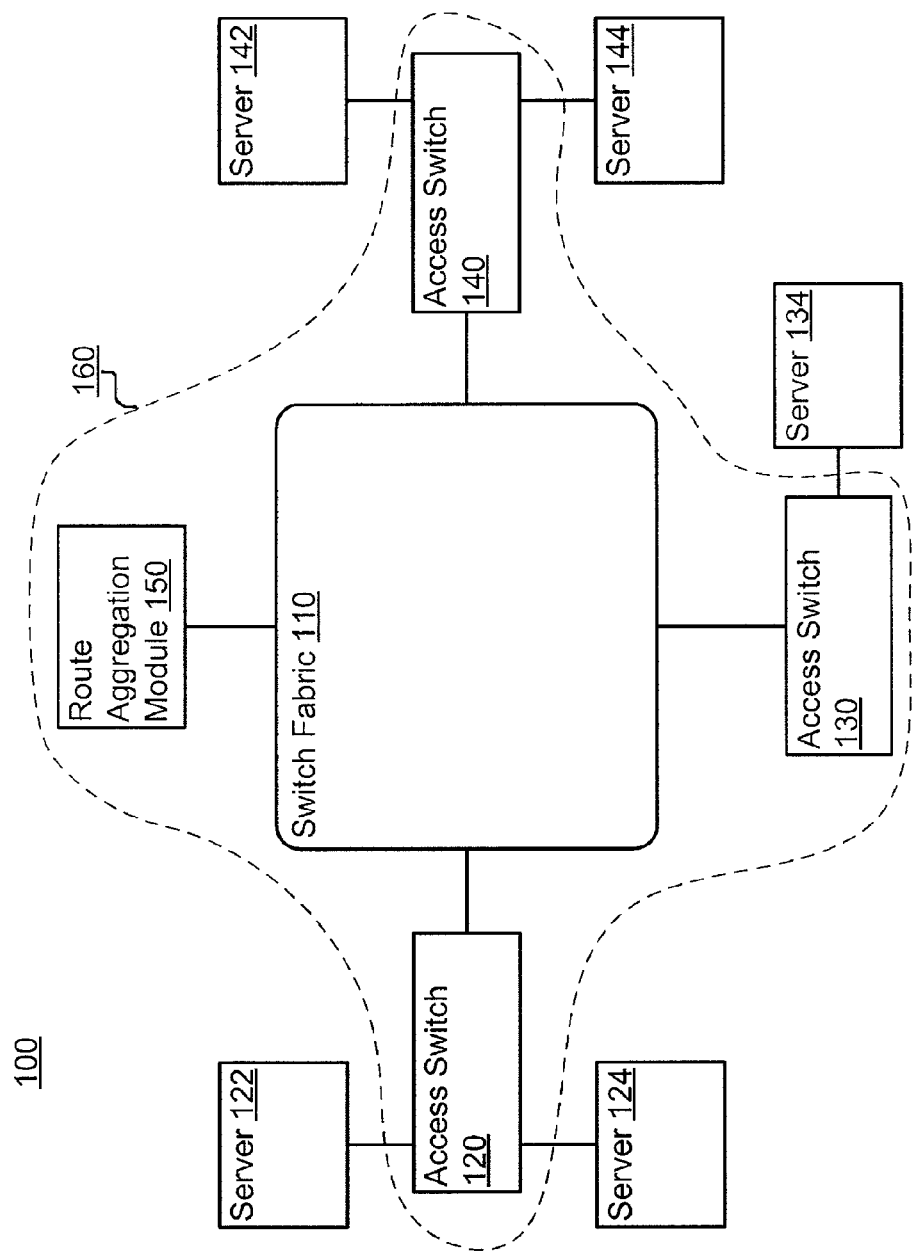
FIG. 1 is a schematic block diagram of a communications system including a distributed network switch and a group of servers, according to an embodiment.

One or more embodiments can aggregate host routes within a communications network such as, for example, a distributed network switch and prevent routing loops within the communications network. For example, a route aggregation module operatively coupled to a distributed network switch can receive data packets including Internet Protocol (IP) addresses from access switches of the distributed network switch. The IP addresses can be associated with servers (e.g., computing devices configured to provide a service such as a web site or other data) operatively coupled to the access switches. In addition to receiving each of the IP addresses, the route aggregation module can receive an identifier associated with the access switch to which the server associated with each IP address from the IP addresses is operatively coupled. In other words, for each IP address the route aggregation module receives, the route aggregation module receives an identifier of an access switch to which the server with that IP address is operatively coupled. Thus, the route aggregation module can define a mapping or relationship between IP addresses and the access switches to which servers associated with the IP addresses are operatively coupled. These mappings (e.g., that a server having a particular IP address is available at or operatively coupled to a particular access switch) can be referred to generically as routes. More specifically, the mappings between an IP address (or server having an IP address) and access switch can be referred to as host routes. In some embodiments, a host route can be a mapping to an access switch and a port (e.g., an egress data port) at that access switch.

The route aggregation module can insert the IP addresses into a tree data structure (or tree) such that the leaf nodes of the tree represent the IP addresses and the internal nodes of the tree represent address prefixes of the IP addresses. The route aggregation module can recursively access each node in the tree and for each internal node of the tree, beginning with internal nodes that are parent nodes of leaf nodes, select an access switch that is operatively coupled to multiple servers with IP addresses having the address prefix of that internal node. The selected access switch can then be associated with that address prefix to define a mapping between that address prefix and the selected access switch. Such a mapping can be referred to as a prefix route.

For some internal nodes of the tree, an internal node can represent an address prefix associated with IP addresses of servers operatively coupled to different access switches. For example, an internal node can represent an address prefix that is associated with IP addresses of a group of servers operatively coupled to a first access switch and is also associated with IP addresses of a different group of servers operatively coupled to a second access switch. The first access switch or the second access switch can be selected to be associated with that internal node. For example, the first access switch can be selected if the first access switch is operatively coupled to a greater number of servers with IP addresses having the address prefix than the number of servers with IP addresses having the address prefix that are coupled to the second access switch. In other words, the access switch that will aggregate the most IP addresses can be selected and associated with that internal node. Thus, the prefix route of that internal node can be a mapping between the address prefix of that internal node and an identifier of the selected access switch (sometimes referred to herein as a next hop destination).

Because a prefix route can be associated with (or represent) host routes of servers (and the IP addresses associated with those servers) that are not directly connected to the access switch associated with that prefix route, data (e.g., data packets and/or data cells) addressed or directed to those servers can be sent to the access switch associated with that prefix route. In other words, data addressed to a particular server can be directed by an aggregate route (i.e., a prefix route) to an access switch that is not directly connected to that server. In such a situation, the access switch that received that data can request a host route for that data (e.g., using an Address Resolution Protocol (ARP) request/response) and can forward that data via that host route to an access switch to which those servers are directly connected using that host route. In other embodiments, the access switch that received that data can perform a lookup for a host route.

For data previously forwarded to a second access switch using an aggregate route from a first access switch, the second access switch can stop using another prefix route to forward the data. The second access switch can stop using the other prefix route to avoid loops in transient cases where the aggregate prefix route is independently calculated on multiple switches and results in a loop. To detect that data has already been forwarded via an aggregate route, various mechanisms can be used. In some embodiments, it a loop can be detected by receiving a data packet on a particular fabric interface. In other embodiments, a data packet can be provided a specific type of tunnel header, similar to an MPLS label. In yet other embodiments, another field within the packet, (e.g., a time to live (TTL) field) can be used to indicate that data has been forwarded using the aggregate route by the first access switch.

In some embodiments, apparatus, systems and methods discussed herein can be applicable to distributed network switches. A distributed network switch can be a portion of a communications network that is configured to switch or route data (e.g., via data packets, data streams, data cells and/or virtual circuits) within the communications network. A distributed network switch can include multiple switch modules each with one or more switch devices that switch or route data within the distributed network switch. For example, a switch module can be housed within a switch chassis including multiple switch devices such as line cards. Each line card can include multiple communication modules that communicate (e.g., send and/or receive electrical and/or optical signals representing data symbols) with other communication modules at line cards of other switch chassis and/or that same switch chassis.

A distributed network switch can include edge devices such as access switches that are configured to communicate with computing devices such as computer servers (e.g., web servers, database servers, file servers, storage devices and/or other computer servers) and a single-hop core of the distributed network switch. A single-hop core of a distributed network switch can be, for example, a switch fabric. An access switch can receive data from a source computer server connected to that access switch and can forward that data to the single-hop core of the distributed network switch. The single-hop core of the distributed network switch can route or switch the data to another access switch, which can forward the data to a destination computer server connected to that other access switch. In some embodiments, an access switch can switch or route data from a source computer server to a destination computer server without forwarding the data through the single-hop core of the distributed network switch if both the source computer server and the destination computer server are connected to that access switch.

In some embodiments, a distributed network switch can include access switches (as discussed above) that are connected to a multistage switch fabric. Data received from source computer servers connected to the access switches can be forwarded to the multistage switch fabric, and the multistage switch fabric can switch or route the data to another access switch to be forwarded to destination computer servers. In some embodiments, an access switch can switch or route data from a source computer server to a destination computer server without forwarding the data to the switch fabric of the distributed network switch if both the source computer server and the destination computer server are connected to that access switch.

In some embodiments, a distributed network switch can include multiple stages. For example, a distributed network switch can include edge devices such as access switches that are configured to communicate with computing devices such as computer servers (e.g., web servers, database servers, file servers, storage devices and/or other computer servers) and aggregation stages and/or core stages of the distributed network switch. An access switch can receive data from a source computer server connected to that access switch and can forward that data to the aggregation stages and/or core stages of the distributed network switch. The aggregation stages and/or core stages of the distributed network switch can route or switch the data to another access switch, which can forward the data to a destination computer server connected to that other access switch. In some embodiments, an access switch can switch or route data from a source computer server to a destination computer server without forwarding the data to aggregation stages and/or core stages of the distributed network switch if both the source computer server and the destination computer server are connected to that access switch.

As used herein, a single hop (e.g., a hop via which a data packet or data cell traverses a single-hop core of a switch fabric or distributed network switch) can be, for example, a single physical hop or a single logical hop. The term "physical hop" can include, for example, a physical link between two modules and/or devices. For example, a data path operatively coupling a first module with a second module can be said to be a physical hop. Similarly stated, a physical hop can physically link the first module with the second module.

The term "single physical hop" can, for example, include a direct physical connection between two modules in a system. Similarly stated, a single physical hop can include, for example, a link via which two modules are coupled without intermediate modules. Accordingly, for example, if a first module is coupled to a second module via a single physical hop, the first module can send data packets directly to the second module without sending the data packets through intervening modules.

The term "single logical hop" means a physical hop and/or group of physical hops that are a single hop within a network topology associated with a first protocol. Similarly stated, for example, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol can use the destination address of the first protocol to route and/or tunnel a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric can function as part of a single logical hop (e.g., a single large-scale consolidated L2/L3 switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages. Similarly stated, a physical hop can operatively couple each stage within a switch fabric representing a single logical hop associated with a protocol used to route data outside the switch fabric. Additionally, packet classification and forwarding associated with a protocol used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used in this specification, the singular forms "a," "an" and "the" include plural referents unless the context clearly dictates otherwise. Thus, for example, the term "a data packet" is intended to mean a single data packet or multiple data packets; and "memory" is intended to mean one or more memories, or a combination thereof.

FIG. 1 is a schematic block diagram of a communications system including a distributed network switch and a group of servers, according to an embodiment. Communications system 100 includes distributed network switch 160 and servers 122, 124, 134, 142 and 144. Servers 122, 124, 134, 142 and 144 can be, for example, general purpose computing devices each including a processor, a memory and a communications interface such as an Ethernet network interface. In some embodiments, servers 122, 124, 134, 142 and 144 can provide one or more services such as file servers, web servers, virtual machine hosting, electronic mail (email) servers and/or other services.

Figure 6:
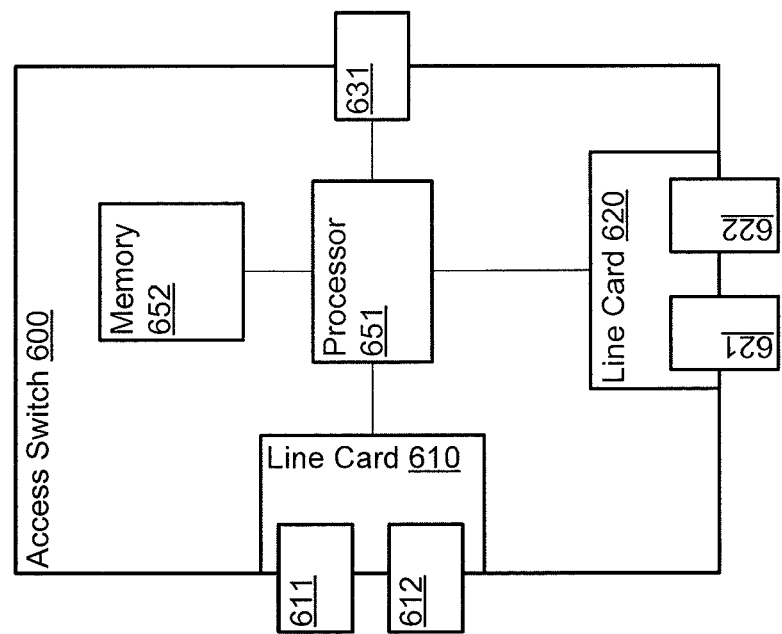
FIG. 6 is a system block diagram of an access switch, according to an embodiment.

Distributed network switch 160 includes access switches 120, 130 and 140, switch fabric 110, and route aggregation module 150. FIG. 6 is a system block diagram of an access switch, according to an embodiment. Access switch 600 includes processor 651, memory 652, line card 610, line card 620, and communications interface 631. Processor 651 is operatively coupled to memory 652, line card 610, line card 620 and communications interface 631. Line card 610 includes communications interfaces 611 and 612. Line card 620 includes communications interfaces 621 and 622. In some embodiments, line cards 610 and/or 620 include one or more processors and/or memories.

Communications interfaces 611, 612, 621 and 622 can be configured to communicate with computing devices such as computer servers (also referred to herein as servers) via a common physical or signaling layer. For example, communications interfaces 611, 612, 621 and 622 can implement a physical layer using twisted-pair electrical signaling via electrical cables or fiber-optic signaling via fiber-optic cables. In some embodiments, some of communications interfaces 611, 612, 621 and 622 implement one physical layer such as twisted-pair electrical signaling and others of communications interfaces 611, 612, 621 and 622 implement a different physical layer such as fiber-optic signaling. Furthermore, communications interfaces 611, 612, 621 and 622 can be configured to communicate with computing devices such as computer servers (servers) via a common protocol such as Ethernet or Fiber Channel. In some embodiments, some of communications interfaces 611, 612, 621 and 622 implement one protocol such as Ethernet and others of communications interfaces 611, 612, 621 and 622 implement a different protocol such as Fiber Channel. Thus, access switch 600 can be in communication with multiple computing devices using homogeneous or heterogeneous physical layers and/or protocols via communications interfaces 611, 612, 621 and 622.

Communications interface 631 can be configured to be in communication with other access switches via a communications network such as a switch fabric. In some embodiments, communications interface 631 can implement a different physical layer and/or protocol than those implemented at communications interfaces 611, 612, 621 and 622. For example, communications interfaces 611, 612, 621 and 622 can be configured to communicate with computing devices using a protocol based on data packets and communications interface 631 can be configured to communicate via a switch fabric using a protocol based on data cells. Said differently, access switch 600 can be an edge device of a network switch such as a distributed network switch.

Referring again to FIG. 1, access switches 120, 130 and 140 include multiple communications interfaces (not shown) and are operatively coupled to switch fabric 110 and servers 122 and 124, 134, and 142 and 144, respectively, via the communications interfaces. In some embodiments, access switch 120 can be operatively coupled to servers 122 and 124 using one type or class of communications interfaces (e.g., twisted-pair wire) and be operatively coupled to switch fabric 110 using a different type or class of communications interface (e.g., fiber optic interface). Furthermore, access switch 120 can communicate with servers 122 and 124 using one protocol (e.g., Ethernet) and with switch fabric 110 using a different protocol (e.g., a cell-based protocol). Similarly, access switch 130 can be operatively coupled to server 134 using one type of communications interface and one protocol and to switch fabric 110 using a different type of communications interface and a different protocol. Moreover, access switch 140 can be operatively coupled to servers 142 and 144 using one type of communications interface and one protocol and to switch fabric 110 using a different type of communications interface and a different protocol. Thus, access switches 120, 130 and 140 can function as edge devices of distributed network switch 160.

Route aggregation module 150 is configured to aggregate routes to servers 122, 124, 134, 142 and 144 operatively coupled to access switches 120, 130 and 140. A route describes how data, such as a data packet, is sent within distributed network switch 160 from one access switch to another. For example, a route can describe how a data packet addressed to server 122 received at access switch 140 from server 142 can be sent to server 122 at access switch 120. Such a route can be, for example, a mapping between an IP address (or other identifier) of server 122 and an identifier of access switch 120 (and/or the communications interface and/or port of access switch 120) to which server 122 is connected. For example, access switch 140 can include a routing table in a memory of access switch 140 with a routing table entry that includes the IP address associated with server 122 and an identifier of access switch 120. The identifier of access switch 120 stored at the routing table can be referred to as a next hop destination. In other words, the next hop for data addressed to server 122 (e.g., data packets including the IP address of server 122) and received at access switch 140 is the access switch with the next hop destination included in the routing table entry, access switch 120 in the example above. Furthermore, the access switch having its identifier included in the routing table entry including an IP address of a server can be referred to as a next hop destination of that server (or the IP address of that server or the route associated with that IP address of that server).

Figure 7:
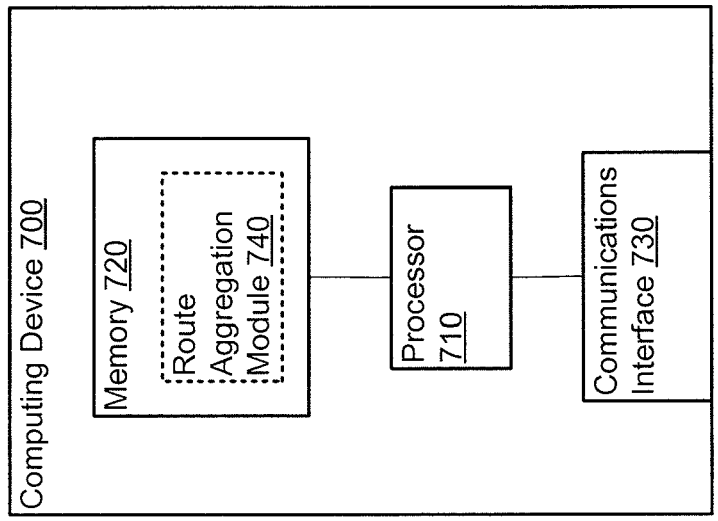
FIG. 7 is a system block diagram of a computing device hosting a route aggregation module, according to an embodiment.

FIG. 7 is a system block diagram of a computing device hosting a route aggregation module, according to an embodiment. Computing device 700 includes processor 710, memory 720, and communications interface 730. Processor 710 is operatively coupled to memory 720 and communications interface 730. Computing device 700 can communicate with other computing device and/or access switches via communications interface 730.

As illustrated in FIG. 7, computing device 700 can be configured to host route aggregation module 740. In other words, route aggregation module 740 can be a process, application, virtual machine, and/or some other software module or a hardware module that is executed at computing device 700. In other words, instructions that implement route aggregation module 740 can be stored at memory 720 and executed at processor 710. In some embodiments, computing device 700 can be dedicated to hosting route aggregation module 740. In other words, computing device 700 can allocate all or substantially all of its computing resources (e.g., processing capacity and memory) to route aggregation module 740. In some embodiments, computing device 700 can be referred to as a route aggregation module. In some embodiments, computing device 700 can host other processes, applications, virtual machines, and/or software modules in addition to route aggregation module 740. For example computing device 700 can be a general purpose computing device or compute node that is configured to host multiple processes, applications, virtual machines, and/or software modules.

Referring again to FIG. 1, in some embodiments, route aggregation module 150 receives IP addresses and next hop destinations (e.g., identifiers of access switches) from access switches 120, 130 and 140 when servers 122, 124, 134, 142 and/or 144 are configured with IP addresses. For example, server 134 can be activated and can request an IP address using, for example, the Dynamic Host Configuration Protocol (DHCP) from a DHCP server (not shown) within or connected to distributed network switch 160. Access switch 130 can detect, for example, by snooping or interpreting DHCP data packets that pass through access switch 130 to server 134, that server 134 has received an IP address and can send that IP address and an identifier of access switch 130 (i.e., a next hop destination) to route aggregation module 150. Route aggregation module 150 can store the IP address of server 134 and the identifier of access switch 130 in a route descriptor at a memory accessible to route aggregation module 150. Similarly, route aggregation module 150 can receive IP addresses and next hop destinations for servers 122, 124, 142, 144 and other servers (not shown) from access switches 120, 130 and 140. Thus, route aggregation module 150 can include route descriptors associated with the servers operatively coupled to distributed network switch 160.

After receiving IP addresses and next hop destinations for servers 122, 124, 142, 144 and other servers (not shown) from access switches 120, 130 and 140, route aggregation module 150 can define aggregate routes for distributed network switch 160. In other words, route aggregation module 150 can define an aggregate route that describes a single route or path to multiple servers. For example, server 122 can send data to each of servers 142 and 144 based on a single aggregate route that defines a single path including access switch 120, switch fabric 110, and access switch 140. In other words, server 122 sends the data using the single aggregate route regardless of which servers 142 and 144 is the destination of the data.

Route aggregation module 150 can then distribute the aggregate routes to access switches 120, 130 and 140. Aggregate routes can be particularly advantageous when many servers are operatively coupled to distributed network switch 160 and access switches 120, 130 and 140 include insufficient amounts of memory to store a route (or route descriptor) for each server. Because each aggregate route represents multiple servers, access switches 120, 130 and 140 can store at a memory a single aggregate route for multiple servers, thus reducing the amount of memory used at access switches 120, 130 and 140. In some embodiments, each access switch 120, 130 and 140 can also install the host routes for hosts to which it is directly connected in addition to the aggregate routes.

In other embodiments, a route aggregation module can independently be implemented on each access switch 120, 130 and 140. In such embodiments and as described in further detail herein, each access switch can identify the host routes to which it is directly connected as "wildcards" or "don't cares" when performing the aggregate route calculation. This can result in greater optimization of routes.

Figure 2:
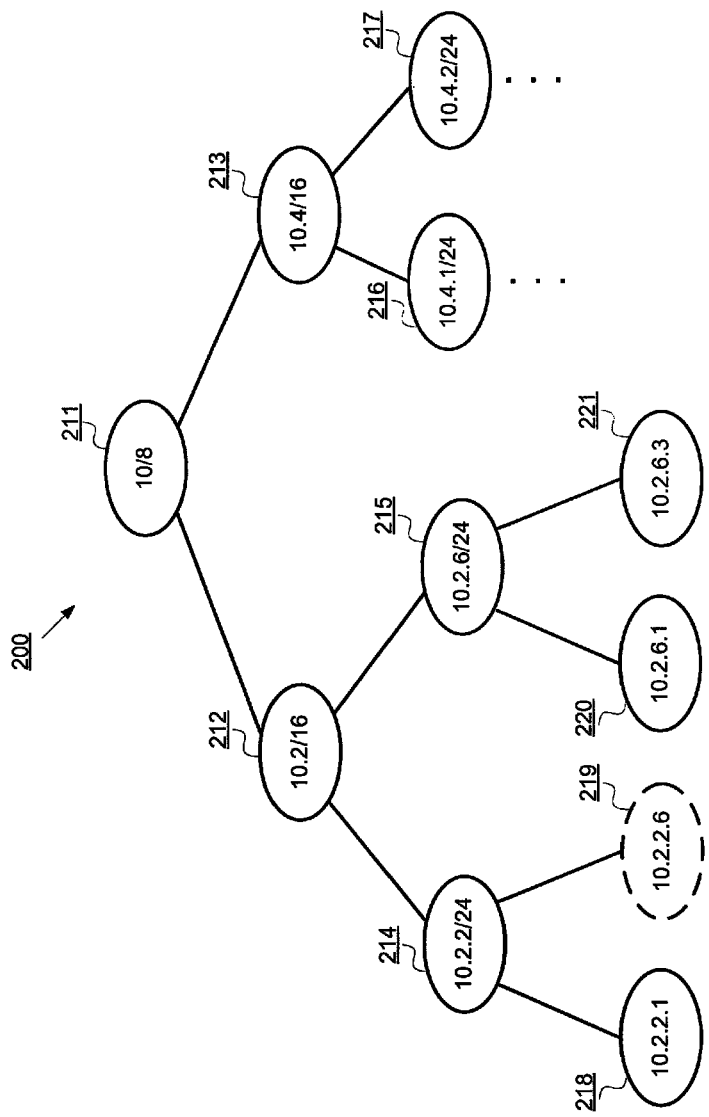
FIG. 2 is an illustration of a tree data structure including a set of nodes associated with host routes and prefix routes, according to an embodiment.

In some embodiments, route descriptors can be arranged as a tree data structure within a memory of route aggregation module 150. FIG. 2 is an illustration of a tree data structure including a set of nodes associated with host routes and prefix routes, according to an embodiment. Prefix routes can be, for example, aggregate routes in which each host route that is included in a prefix route include an address associated with that prefix route. Tree (or tree data structure) 200 can be stored in a memory of, for example, route aggregation module 150 and includes multiple nodes. Tree 200 is organized as a binary tree. In some embodiments, a tree can be an m-ary tree, a B-tree, and B+ tree, or some other tree.

The nodes of tree 200 can be described relative to other nodes in tree 200 as having familial relationships. For example, nodes 214 and 215 are child nodes (or children) of node 212. Thus, node 212 is a parent node (or parent) of nodes 214 and 215. Also, node 215 is a sibling node (or sibling) of node 214. Node 211 is a grandparent node (or grandparent) of nodes 214, 215, 216 and 217, and nodes 214, 215, 216 and 217 are grandchildren nodes (or grandchildren) of node 211.

Node 211, the node in tree 200 that does not have a parent (or has a special parent that indicates that node 211 is the root node), can be referred to as the root node (or root) of tree 200. Nodes 212, 213, 214, 215, 216 and 217 have children and can be referred to as internal nodes of tree 200. Nodes 218, 219, 220 and 221 do not have any children (or have special children that indicated that these nodes are leaf nodes) can be referred to as leaf nodes of tree 200.

The nodes of tree 200 are route descriptors (see the discussion of FIG. 4 herein below) that are associated with routes within (or through) a network switch such as a distributed network switch. Nodes 211, 212, 213, 214, 215, 216 and 217 represent or are associated with prefix routes (e.g., aggregate routes based on an address prefix). For example, Node 211 can represent a prefix route with an address prefix of 10/8 using slash notation. More specifically, 10/8 represents IP addresses 10.0.0.0 through 10.255.255.255. In other words, node 211 represents an address prefix of 10 in the first octet of IP addresses using dot notation. Node 212 can represent a prefix route with an address prefix of 10.2/16 using slash notation. Node 213 can represent a prefix route with an address prefix of 10.4/16 using slash notation. Node 214 can represent a prefix route with an address prefix of 10.2.2/24 using slash notation. Node 215 can represent a prefix route with an address prefix of 10.2.6/24 using slash notation. Node 216 can represent a prefix route with an address prefix of 10.4.1/24 using slash notation. Node 217 can represent a prefix route with an address prefix of 10.4.2/24 using slash notation.

Nodes 218, 219, 220 and 221 represent or are associated with host routes (e.g., IP addresses of servers or other computing devices operatively coupled to a network switch). Node 218 represents a host route associated with IP address 10.2.2.1. Node 219 represents a host route associated with IP address 10.2.2.6. Node 220 represents a host route associated with IP address 10.2.6.1. Node 221 represents a host route associated with IP address 10.2.6.3.

In some embodiments, tree 200 can include nodes that represent different and/or additional address prefixes and/or host routes. For example, tree 200 can include /0 through /32 address prefixes for IPv4 routes. In some embodiments, tree 200 can include nodes that represent each host route and address prefix within the addressable space of IP version 4 (IPv4) and/or IP version 6 (IPv6). In some embodiments, tree 200 can include nodes that represent a subset of the host routes and address prefixes within the addressable space of IPv4 and/or IPv6.

In some embodiments, a route aggregation module can define tree 200 within a memory accessible to the route aggregation module before the route aggregation module receives route information such as a group of next hop indicators each associated with a next hop destination, or an IP prefix. For example, a route aggregation module can define tree 200 for a known or predetermined range of IP addresses. After tree 200 is defined and before route information is received, the leaf nodes can be marked or flagged as representing an inactive IP address or inactive host route. In other words, each route descriptor representing a leaf node can include an indicator having a value that describes whether routing information related to that leaf node (e.g., the IP address associated with that leaf node) has been received. If no routing information for a leaf node has been received and/or inserted into tree 200, the value of the indicator for that leaf node can indicate that the leaf node is associated with or represents an inactive host route. In other words, the leaf node represents a host route or IP address that is not yet used within a network switch. If routing information for that leaf node has been received and/or inserted into tree 200, the value of the indicator can indicate that the leaf node is associated with an active host route. In other words, the leaf node represents a host route or IP address that is currently used within a network switch. As illustrated in FIG. 2, leaf nodes 218, 220 and 221 represent active host route and leaf node 219 represents an inactive host route. Said differently, tree 200 is associated with a network switch in communication with servers and/or other computing devices with IP addresses 10.2.2.2, 10.2.6.1 and 10.2.6.3, and no server and/or other computing device with an IP address of 10.2.2.6 is in communication with that network switch. In some embodiments, however, for a 10/8 prefix, if IP address 10.2.2.6 is included in the network, it is connected to the access switch 600, and not to another access switch.

After tree 200 is defined, routing information such as IP addresses, next hop identifiers and/or next hop destinations can be inserted into the nodes (sometimes collectively referred to as a route descriptor) of tree 200. In other words, when a route aggregation module receives routing information, the route aggregation module can insert that information into the appropriate nodes of tree 200. More specifically, for example, the route aggregation module can insert an IP address and an associated next hop destination (not shown in FIG. 2) into a leaf node that represents that IP address. For example, a leaf node can be a route descriptor (as discussed herein in relation to FIG. 4) that includes a route identifier field and a next hop destination field. The route identifier field can be set to have a value associated with the IP address represented by the leaf node, and the next hop destination field can be set to have a value associated with the next hop destination (e.g., an identifier of the best next hop destination from the group of next hop indicators). Thus, tree 200 can be defined or instantiated before routing information is received and populated dynamically as routing information is received.

In some embodiments, tree 200 can be defined and populated dynamically as routing information is received. In other words, when routing information related to an IP address is received, a route aggregation module can define the appropriate nodes within tree 200 to represent the prefix routes associated with the IP address as internal nodes of tree 200 and insert the routing information at a leaf node of tree 200 that is associated with the IP address.

Figure 3:
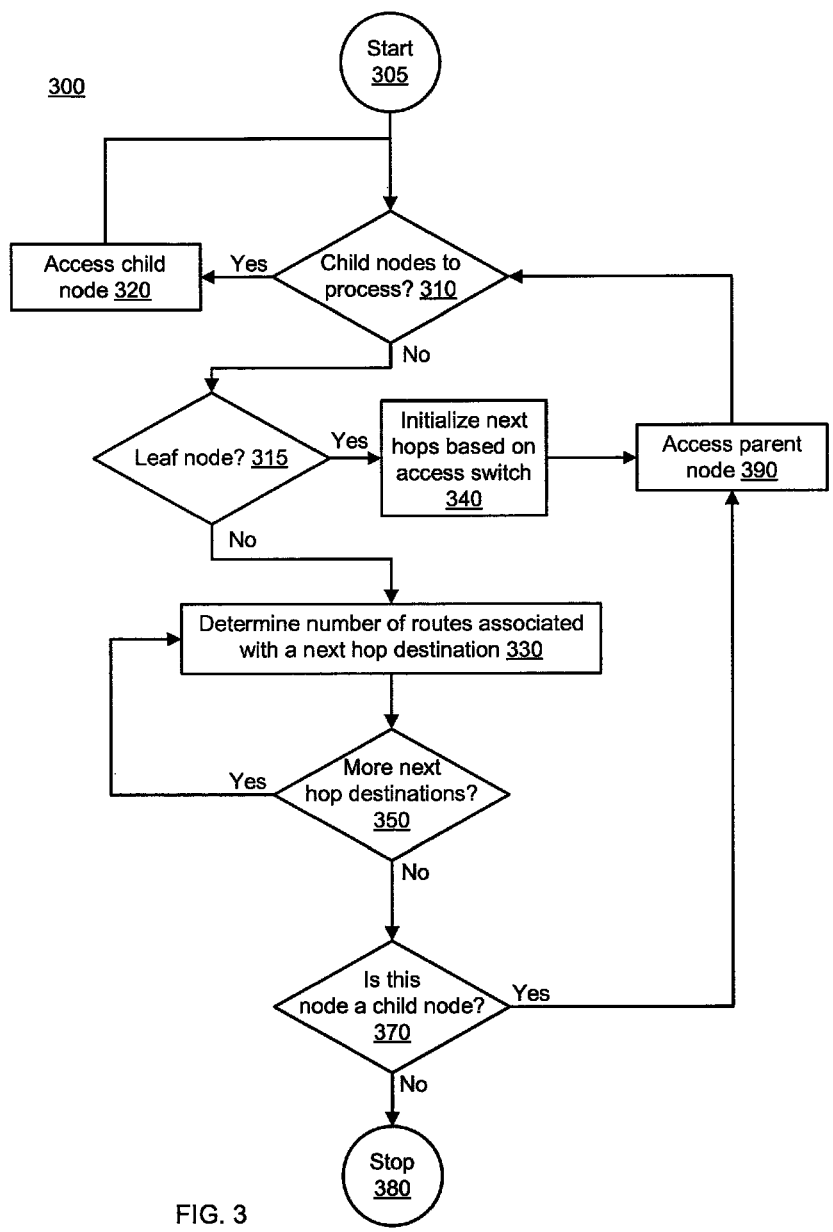
FIG. 3 is a flow chart of a method for aggregating routes, according to an embodiment.

After tree 200 is at least partially populated (e.g., routing information has been received for at least some subset of the leaf nodes of tree 200), the information stored at or included within tree 200 can be used to define aggregate routes. For example, IP addresses stored at nodes of tree 200 can be used to define prefix routes. FIG. 3 is a flow chart of a method 300 for aggregating routes, according to an embodiment. Method 300 is recursive and begins at a root node of a tree such as, for example, tree 200, at 305. Additionally, the leaf nodes of the tree can be initialized to have particular initial values. For example, the nodes of the tree can include values that represent a number of routes not required to be installed when using a particular next hop indicator for that node. For each leaf node route identifier (e.g., the leaf node representing the IP address of that server), the value for each next hop indicator other than the next hop destination to which the server associated with that leaf node is connected can be set to a negative value (e.g., −1) or some other value indicating that the server is not connected to that next hop destination and an additional route can be installed if that particular next hop destination is chosen. The value for the next hop destination to which the server associated with that leaf node is connected can be set to a value of zero or some other value indicating that the server is connected to that next hop destination. Additionally, for the leaf node route identifier, the next hop destination can be set to the best next hop indicator of that leaf node (i.e. the server with which that leaf node is associated). Thus, the next hop destination to which the server associated with a leaf node is connected can be preferred for aggregation of that leaf node. If a leaf node is associated with an inactive host route, the value for each next hop indicator can be set to zero or some other value indicating that the leaf node represents an IP address that is not currently active within a network switch. By maintaining this value for each next hop indicator, no particular next hop indicator will be preferred over another for leaf nodes representing inactive host routes. In some embodiments, a next hop destination can be set to include one or more next hop indicators. Leaf nodes representing inactive host routes can be treated as "wildcards" or "don't cares" during aggregation and can be aggregated with other routes to generate the largest groupings of aggregate routes. Moreover, any affect in choosing a next hop for a parent aggregate route is diminished or substantially nullified by setting the value to zero.

Similar to inactive host routes, locally connected host routes can be treated as "wildcards" or "don't cares". Locally connected host routes are installed by a switch. Accordingly, aggregate routes do not affect the locally connected host routes, regardless of which next hop is chosen for the aggregate next hops. The method 300 can then proceed recursively, beginning with the root node with a route prefix representing the range of addresses to be aggregated. The initialization of host route descriptors, as explained above, is used in step 340 of method 300, described in further detail herein.

Using the aggregate routes, an access switch can send a data packet to an intermediary access switch prior to the intermediary access switch sending the data packet to the destination access switch. In some embodiments, for example, using an aggregate route, a first access switch can send, via a third access switch, a data packet to a computing device connected to a second access switch. The first access switch can initially send the data packet to the third access switch using a first next hop destination. The first next hop destination can be associated with the aggregate route (including a network address of the computing device connected to the second access switch). Accordingly, the first access switch does not request (e.g., using an Address Resolution Protocol (ARP) request) a second next hop destination associated with the network address, but instead uses the aggregate route. The third access switch can then use the network address of the computing device (e.g., received in response to an ARP request) to send the data packet to the second access switch.

If the current node—beginning with the root node with a route prefix representing the range of addresses to be aggregated—of the tree has one or more child nodes that have yet to be processed, at 310, a child node is accessed, at 320, and method 300 returns to step 310 with that child node as the current node. If the current node does not include child nodes that have yet to be processed, at 310, it is determined whether the current node is a leaf node, at 315. If the current node is a leaf node the next hops for that node are initialized based on the access switch associated with that leaf node as described with respect to step 340 in method 300. More specifically, the next hop destination for that leaf node can be set to an identifier of an access switch associated with that leaf node. The current node's parent node is accessed and set as the current node, at 390. The new current node can then be processed as the current node starting at step 310.

If the current node is not a leaf node, the number of routes not required to be installed when at the route descriptor is associated with a particular next hop destination of the current node is determined, at 330. In other words, at 330, the number of routes that can be aggregated by setting the next hop destination of the current node to be the identifier of a particular next hop destination (e.g., an identifier of a particular access switch) is determined. The result can be stored in a next hop indicator associated with that next hop destination.

If there are additional potential next hop destinations, at 350, step 330 is repeated for each next hop destination. In other words, each next hop destination (e.g., each access switch within a network switch) can be considered during method 300 to determine which next hop destination(s) best aggregates routes for the current node. As step 330 proceeds for each possible next hop indicator, the best next hop destination(s) is updated in the next hop destination field of each route descriptor to store the next hop destination(s) corresponding to the next hop indicator(s) that has the largest number of routes not required to be installed based on the current set of next hop indicators already considered. In some embodiments, step 330, can be implemented as follows. For each next hop destination, the number of additional routes not required to be installed when a route descriptor is associated with (or represented by) that next hop destination at the current node can be the greatest of: (1) the sum of the number of additional routes not required to be installed associated with that next hop destination at the first child and the number of additional routes not required to be installed associated with that next hop destination at the second child plus one (one is added because parent node can represent both child nodes in this case); (2) the sum of the number of additional routes not required to be installed associated with that next hop destination at the first child and the number of additional routes not required to be installed associated with the best next hop destination(s) (i.e., the next hop destination associated with the largest number of additional routes not required to be installed) of the second child; (3) the sum of the number of routes associated with the best next hop destination(s) (i.e., the next hop destination associated with the largest number of additional routes not required to be installed) of the first child and the number of routes associated with that next hop destination at the second child; and (4) the sum of the number of routes associated with the best next hop destination(s) (i.e., the next hop destination associated with the largest number of additional routes not required to be installed) of the first child and the number of additional routes not required to be installed associated with the best next hop destination(s) (i.e., the next hop destination associated with the largest number of additional routes not required to be installed) of the second child minus one (one is subtracted because the parent node is represented in addition to the child nodes). The greatest of the three values for the number of routes calculated is associated with that next hop indicator in the parent aggregate route. In addition, the next hop(s) of the two child nodes that contributed to the largest number of routes is also stored.

Due to the initialization discussed above, for parents of leaf nodes representing active host routes, the next hop destination of at least one of the leaf nodes is selected as the next hop destination for the parent of those leaf nodes. In other words, the next hop destinations of leaf nodes representing active host routes are preferred by method 300 as the next hop destination for the parent of those leaf nodes. Conversely, because leaf nodes that represent inactive host routes do not have a next hop destination (i.e., IP addresses represented by these leaf nodes are not active in the network switch) no next hop destination is preferred by method 300 as the next hop destination for the parent of those leaf nodes. Accordingly, if a parent has a first child that is a leaf node representing an active host route and a second child that is a leaf node representing an inactive host route, the next hop destination of the first child is preferred by method 300 as the next hop destination for that parent.

After the next hop destination for the current node is determined, method 300 determines if the current node is a child node, at 370 (i.e., the current node has a parent node, or, said another way, is not the root node of the tree). If, at 370, the current node is not a child node (i.e., the current node is the root node), method 300 terminates, otherwise, the current node's parent node is accessed and set as the current node, at 390. The new current node can then be processed as the current node starting at step 310.

In some embodiments, method 300 can include more or fewer steps than illustrated in FIG. 3. For example, method 300 can include initialization and/or instantiation steps, as described above, before step 310. Furthermore, method 300 can include traversing the tree after step 380 to determine which set of aggregate routes (or prefix routes) results in a reduced number (e.g., the least number) of routes that are semantically equivalent to the original set of leaf routes with respect to forwarding next hops. For example, method 300 can perform a recursive "pre order depth-first traversal" of the tree beginning at the root node of the tree. A next hop of the root node that represents the largest number of routes not required to be installed at the root node can be selected. In some embodiments, children of a node can select their next hops as next hops associated with the selected next hop of the parent. The next hops of the children are stored at the parent node's next hop indicator as described above with respect to step 330 of method 300 (FIG. 3). If, at any point, the next hop of a child node is the same as its parent node's chosen next hop, that route prefix associated with that child node is not programmed. In other words, the output of the traversal of the tree is the routes that are represented as nodes in the tree (i.e., (1) a root node, or (2) a child node (including a leaf node) with a different next hop destination than the parent node). Thus, performing a longest prefix match lookup on the routes output of this traversal for any IP address represented by a leaf node in the tree will output or yield the same next hop destination as the next hop destination for the leaf node representing that IP address. Additionally, in some embodiments, a route aggregation module implementing method 300 can send the routes (i.e., host routes and prefix routes) output by the traversal to access switches within a distributed network switch. The access switches store these routes in databases or routing tables and can make routing determinations such as to which access switch in the distributed network switch to send a data packet based on the routes. Moreover, in some embodiments, steps of method 300 can be rearranged.

Figure 4:
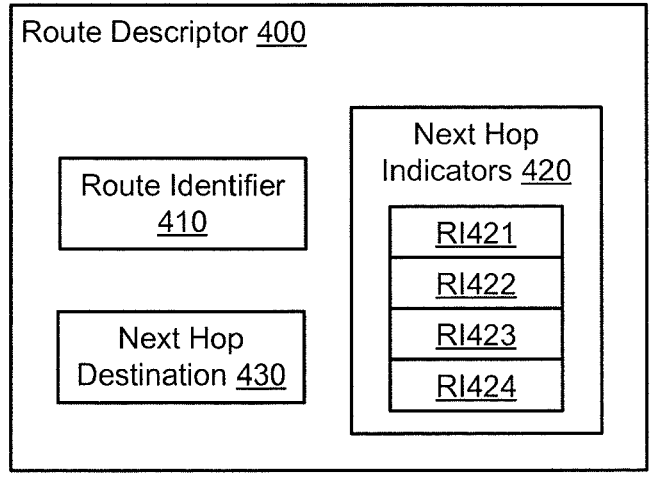
FIG. 4 is a schematic diagram of a route descriptor, according to an embodiment.

FIG. 4 is a schematic diagram of a route descriptor, according to an embodiment. Route descriptor 400 includes route identifier 410, next hop destination 430 and a group of next hop indicators 420 including next hop indicators RI421, RI422, RI423 and RI424. Route identifier 410 can include a value that identifies a route represented by or associated with route descriptor 400. For example, route identifier 410 can be set to a value of an IP address or address prefix such as the address prefixes discussed above in relation to FIG. 2. In other words, if route descriptor 400 represents (or describes) a prefix route, route identifier can be set to a value of an address prefix of that prefix route. Similarly, if route descriptor 400 represents (or describes) a host route, route identifier can be set to a value of an IP address of that host route. Alternatively, route identifier 410 can be a reference or index of a route in a table or database of routes.

Each next hop indicator RI421, RI422, RI423 and RI424 in the group of next hop indicators 420 can have a value that indicates the number of routes not required to be installed if the next hop destination represented by that next hop indicator is chosen for the route descriptor. Said differently, each of next hop indicators RI421, RI422, RI423 and RI424 can be uniquely associated with a next hop destination, and each of next hop indicators RI421, RI422, RI423 and RI424 can have a value that indicates the number of routes not required to be installed if that next hop indicator is used as a next hop for route descriptor 400. In addition, each next hop indicator RI421, RI422, RI423 and RI424 can store the next hop destination(s) of the two child nodes that contributed to that next hop indicator RI421, RI422, RI423 and RI424 based on step 330 of method 300 (FIG. 3).

Next hop destination 430 can include a value that indicates which next hop destination(s) is associated with the route identified by route identifier 410. Additionally, next hop destination 430 can include an identifier of the next hop destination in it's group of next hop indicator(s) associated with the largest number of routes not required to be installed for that route descriptor. While shown in FIG. 4 as having a single next hop destination 430, in other embodiments, a route descriptor can include multiple next hop destinations.

Figure 5:
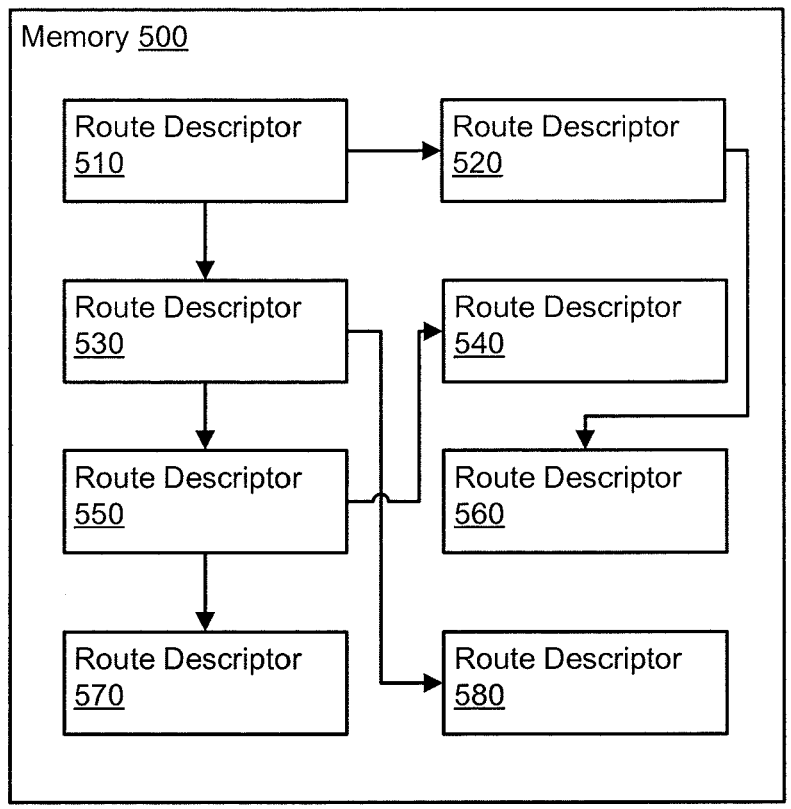
FIG. 5 is a schematic diagram of a group of route descriptors stored in a memory as a tree, according to an embodiment.

Numerous route descriptors 400 can be configured as nodes of a tree such as tree 200 illustrated in FIG. 2. For example, route descriptor 400 can include references (not shown) to other route descriptors 400 such that a tree with route descriptor nodes (i.e., nodes that are route descriptors 400) can be implemented as a linked-node structure within a memory as illustrated in FIG. 5. FIG. 5 is a schematic diagram of a group of route descriptors stored in a memory as a tree, according to an embodiment. Route descriptor 510 is the root node of a tree, route descriptors 520, 530 and 550 are internal nodes of the tree, and route descriptors 540, 560, 570 and 580 are leaf nodes of the tree. In other words, parent route descriptor nodes can include reference to child route descriptor nodes. As illustrated in FIG. 5, the arrows from a route descriptor point to the children (or child) of that route descriptor. For example, route descriptors 520 and 530 are children of route descriptor 510.

In some embodiments, a tree of route descriptors (or other nodes) can be implemented as an array or table, and the index of the entries (i.e., route descriptors) in the array can indicate the relationships (e.g., parents and children) of the entries. For example, for a binary tree the children of a node can be determined from the index of that node by adding one to the index of that node and then multiplying the sum by two. The result of the multiplication is the index of the first child of that node, and subtracting one from the result of the multiplication is the index of the second child of that node.

Figure 8:
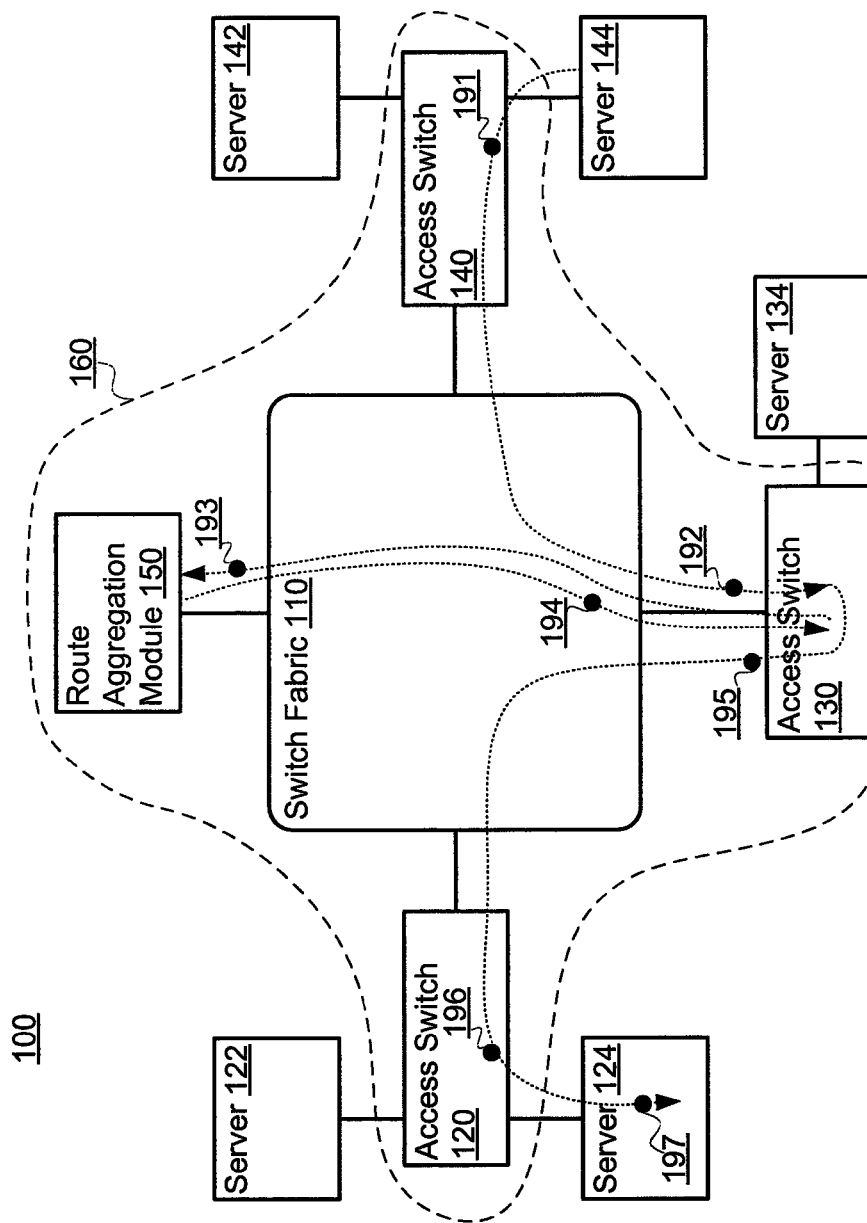
FIG. 8 is an illustration of a path of a data packet within the communications system of FIG. 1, according to an embodiment.

FIG. 8 is an illustration of a path including points 191, 192, 195, 196 and 197 of a data packet within the communications system of FIG. 1, according to an embodiment. A data packet addressed to server 124 is sent from server 144 to access switch 140. Access switch 140 receives the data packet and performs a longest prefix match lookup based on the IP address of server 124 included in the data packet (see 191 in the path). For example, access switch 140 can perform the longest prefix match lookup on a database or table including host routes of servers directly coupled to access switch 140 and prefix routes received from route aggregation module 150. The longest prefix match lookup yields a prefix route representing an address prefix that is included in the IP address of server 124. The prefix route is an aggregate route that identifies access switch 130 as the next hop destination (e.g., the next hop destination of the prefix route is an identifier of access switch 130). In other words, a route aggregation method or process such as method 300 illustrated in FIG. 3 defined an aggregate route that includes the IP address of server 124 and the IP address of server 134, and has a next hop destination of access switch 130.

The data packet is then sent, via switch fabric 110, to access switch 130 (see 192 in the path). Access switch 130 performs a lookup in a routing table based on the IP address of server 124 included in the data packet to determine to which port of access switch 130 server 124 is connected. This lookup results in no match because the host route for the IP address of server 124 is not included in the routing table of access switch 130. The host route of each server directly connected to an access switch is stored at the routing table of that access switch. Thus, when an access switch receives a data packet including an IP address of a server directly connected to the access switch, that access switch can determine to which port of the access switch the server is connected by performing a lookup in the routing table of that access switch.

When the lookup results in a no match or when the lookup results in an aggregate route or prefix route that has a next hop destination of the access switch performing the lookup, however, that access switch can send a next hop identifier request to determine a next hop destination for that data packet. In some embodiments, an access switch can determine that the data packet was received via a communications interface in communication with switch fabric 110 and determine that a next hop identifier request should be sent if a lookup result is a no match and the data packet was received via the communications interface in communication with switch fabric 110.

The next hop identifier request prevents route loops within a network switch such as distributed network switch 160. For example, the next hop identifier request avoids a situation in which after determining that server 124 is not directly connected to access switch 130, access switch 130 performs a longest prefix match lookup, excluding routes with a next hop destination of access switch 130, based on the IP address included in the data packet. This type of lookup can otherwise result in a prefix route that is a shorter prefix match than the prefix match received at access switch 140 (i.e., the result of the longest prefix match lookup associated with the prefix route having access switch 130 as the next hop destination) and has a next hop destination of access switch 140. Access switch 130 would, in response to such a result, send the data packet back to access switch 140. When access switch 140 again performs the longest prefix match lookup, it will receive the same prefix route it received as a result of the prior longest prefix match lookup at access switch 140 (i.e., the prefix route having access switch 130 as a next hop destination) and will again send the data packet to access switch 130. This cycle will repeat, thus becoming an undesirable route loop.

When the next hop identifier request is used as illustrated in FIG. 8, however, such undesirable route loops can be avoided. A next hop identifier request including the IP address of server 124 is sent from access switch 130 to route aggregation module 150 (see 193). Route aggregation module 150 can receive the next hop identifier request and determine a host route for the IP address of server 124. The host route is then sent from route aggregation module 150 to access switch 130 (see 194).

Access switch 130 sends the data packet to access switch 120 (see 195 in the path) based on the host route received from route aggregation module 150. More specifically, the host route can include a next hop destination that is associated with access switch 120, and access switch 130 can send the data packet to access switch 120 in response to the host route. Access switch 120 receives the data packet and performs a lookup in a routing table based on the IP address of server 124 included in the data packet to determine to which port of access switch 120 server 124 is connected (see 196 in the path). This lookup results in an identifier of the port of access switch to which server 124 is connected, and the data packet if sent to server 124 (see 197 in the path).

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

A processor can be, for example, a single physical processor such as a general-purpose processor, an ASIC, a PLD, or a FPGA having a single processing core or a group of processing cores. In some embodiments, a processor can be a group or cluster of processors such as a group of physical processors operatively coupled to a shared clock or synchronization signal, a shared memory, a shared memory bus, and/or a shared data bus. In other words, a processor can be a group of processors in a multi-processor computing device. In some embodiments, a processor can be a group of distributed processors (e.g., computing devices with one or more physical processors) operatively coupled one to another via a communications network. Said differently, a processor can be a group of distributed processors in communication one with another via a communications network. In some embodiments, a processor can be a combination of such processors. For example, a processor can be a group of distributed computing devices, where each computing device includes a group of physical processors sharing a memory bus and each physical processor includes a group of processing cores.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a memory, the memory configured to store a plurality of route descriptors as a tree, each route descriptor from the plurality of route descriptors including a next hop destination associated with a route associated with that route descriptor, each route descriptor including a next hop indicator having a value associated with a quantity of routes represented by that route descriptor, each route descriptor from the plurality of route descriptors being a node from a plurality of nodes of the tree;
a communications interface configured to be in communication with an access switch; and
a processor operatively coupled to the memory and the communications interface, the processor configured to access a first route descriptor from the plurality of route descriptors, the first route descriptor having a first child route descriptor from the plurality of route descriptors, the first route descriptor having a second child route descriptor from the plurality of route descriptors, the processor configured to define, at a first time, a value of the next hop destination of the first route descriptor based on a value of the next hop destination of the first child route descriptor and a value of the next hop destination of the second child route descriptor, the processor configured to send, at a second time after the first time, the value of the next hop destination of the first route descriptor to the access switch via the communications interface in response to a next hop identifier request from the access switch.

2. The method of claim 1, wherein the tree includes leaf nodes and internal nodes, the leaf nodes being associated with host routes, the internal nodes being associated with prefix routes.

3. The apparatus of claim 1, wherein the next hop identifier request is triggered by an Address Resolution Protocol request.

4. The apparatus of claim 1, wherein:
the first route descriptor has a parent route descriptor from the plurality of route descriptors;
the first route descriptor has a sibling route descriptor from the plurality of route descriptors; and
the processor is configured to define, at a third time after the first time and before the second time, the value of the next hop destination of the parent route descriptor based on the value of the next hop destination of the first route descriptor and the value of the next hop destination of the sibling route descriptor.

5. The apparatus of claim 1, wherein:
the next hop indicator of the first child route descriptor is from a plurality of next hop indicators of the first child route descriptor, each next hop indicator from the plurality of next hop indicators of the first child route descriptor is uniquely associated with a next hop destination; and
the value of the next hop indicator of the first child route descriptor being greater than a value of each remaining next hop indicator from the plurality of next hop indicators of the first child route descriptor.

6. The apparatus of claim 1, wherein:
the first child route descriptor is associated with a first host route;
the second child route descriptor is associated with a second host route; and
the first route descriptor is associated with a route prefix of the first host route and the second host route.

7. The apparatus of claim 1, wherein:
the first child route descriptor is associated with a first host route;
the first child route descriptor includes a plurality of next hop indicators of the first child route descriptor, each next hop indicator from the plurality of next hop indicators of the first child route descriptor is uniquely associated with a next hop destination and having a negative value;
the value of the next hop indicator of the first child route descriptor is greater than the negative value of each remaining next hop indicator from the plurality of next hop indicators of the first child route descriptor.

8. The apparatus of claim 1, wherein:
the first child route descriptor is associated with a first route prefix;
the second child route descriptor is associated with a second route prefix; and
the first route descriptor is associated with a third route prefix, the third route prefix being a route prefix of the first route prefix and the second route prefix.

9. The apparatus of claim 1, wherein:
the first child route descriptor is associated with an active host route;
the second child route descriptor is associated with an inactive host route, the value of the next hop destination of the first child route descriptor is associated with a destination, the value of the next hop destination of the second child route descriptor is associated with the destination.

10. The apparatus of claim 1, wherein the first route descriptor represents the quantity of routes represented by the first route descriptor using a single route prefix such that the access switch is configured to store a reduced number of routes.

11. A method, comprising:
storing a plurality of route descriptors at a memory, each route descriptor from the plurality of route descriptors including a next hop destination associated with a route associated with that route descriptor, each route descriptor including a next hop indicator having a value associated with a quantity of routes represented by that route descriptor, each route descriptor from the plurality of route descriptors being a node from a plurality of nodes of a tree;
accessing a first route descriptor from the plurality of route descriptors, the first route descriptor having a first child route descriptor from the plurality of route descriptors, the first route descriptor having a second child route descriptor from the plurality of route descriptors, the first route descriptor having a parent route descriptor from the plurality of route descriptors;
defining a value of the next hop destination of the first route descriptor based on at least one of a value of the next hop destination of the first child route descriptor and a value of the next hop destination of the second child route descriptor; and
defining the value of the next hop destination of the parent route descriptor based on at least the value of the next hop destination of the first route descriptor.

12. The method of claim 11, further comprising sending the value of the next hop destination of the parent route descriptor to an access switch.

13. The method of claim 11, wherein:
the first route descriptor has a sibling route descriptor from the plurality of route descriptors; and
the value of the next hop destination of the parent route descriptor is defined based on the value of the next hop destination of the first route descriptor and the value of the next hop destination of the sibling route descriptor.

14. The method of claim 11, wherein:
the value of the next hop destination of the first child route descriptor is the same as the value of the next hop destination of the second child route descriptor; and
the value of the next hop indicator of the first route descriptor is one more than a sum of value of the next hop indicator of the first child route descriptor and the value of the next hop indicator of the second child route descriptor.

15. The method of claim 11, wherein:
the value of the next hop destination of the first child route descriptor is different from the value of the next hop destination of the second child route descriptor; and
the value of the next hop indicator of the first route descriptor is a sum of the value of the next hop indicator of the first child route descriptor and the value of the next hop indicator of the second child route descriptor.

16. A system, comprising:
a first access switch including a first communications interface, a second communications interface and a processor, the first communications interface of the first access switch configured to be coupled to a first computing device, the first computing device associated with a first network address;
a second access switch including a first communications interface, a second communications interface and a processor, the first communications interface of the second access switch configured to be coupled to a second computing device, the second computing device associated with a second network address;
a third access switch including a communications interface and a processor; and
a switch fabric operatively coupled to the second communications interface of the first access switch, the communications interface of the third access switch and the second communications interface of the second access switch, the processor of the first access switch configured to receive a data packet including the second network address from the first computing device via the first communications interface of the first access switch,
the processor of the first access switch configured to select a first next hop destination associated with an address prefix of the second network address from a plurality of next hop destinations based on the second network address,
the processor of the first access switch configured to send the data packet to the third access switch via the switch fabric based on the first next hop destination without requesting a second next hop destination associated with the second network address,
the processor of the third access switch configured to request the second next hop destination associated with the second network address if the processor of the third access switch determines that the second computing device is not directly coupled to the third access switch, the second next hop destination different from the first next hop destination,
the processor of the third access switch configured to send the data packet to the second access switch based on the second next hop destination.

17. The system of claim 16, wherein the second network address is included in an aggregate route of the first next hop destination.

18. The system of claim 16, wherein the second network address includes the address prefix.

19. The system of claim 16, wherein the processor of the third access switch is configured to request the second next hop destination using an Address Resolution Protocol.

20. The system of claim 16, wherein the first next hop destination is associated with the second access switch and the third access switch such that the first access switch is configured to store a reduced number of next hop destinations.

* * * * *